United States Patent
Mason et al.

(10) Patent No.: US 9,982,640 B2
(45) Date of Patent: May 29, 2018

(54) FUEL PUMP MODULE WITH REPLACEABLE FILTER UNIT

(71) Applicant: Robert Bosch GmbH, Stuttgart (DE)

(72) Inventors: Paul Mason, Dearborn, MI (US); David Toutant, Grosse Pointe Woods, MI (US); Tommy Ristovski, Sterling Heights, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/500,207

(22) PCT Filed: Aug. 25, 2015

(86) PCT No.: PCT/IB2015/056443
§ 371 (c)(1),
(2) Date: Jan. 30, 2017

(87) PCT Pub. No.: WO2016/030826
PCT Pub. Date: Mar. 3, 2016

(65) Prior Publication Data
US 2017/0241386 A1    Aug. 24, 2017

Related U.S. Application Data

(60) Provisional application No. 62/042,628, filed on Aug. 27, 2014.

(51) Int. Cl.
*B60K 15/077*    (2006.01)
*F02M 37/10*    (2006.01)
(Continued)

(52) U.S. Cl.
CPC ......... *F02M 37/106* (2013.01); *B60K 15/077* (2013.01); *F02M 37/0052* (2013.01); *F02M 37/22* (2013.01)

(58) Field of Classification Search
CPC .. F02M 37/106; F02M 37/0052; F02M 37/22; F02M 37/0047; F02M 37/0023;
(Continued)

(56) References Cited

U.S. PATENT DOCUMENTS

2002/0000220 A1* 1/2002 Hazama ............... F02M 37/025
123/510
2005/0045159 A1  3/2005 Honda et al.
(Continued)

FOREIGN PATENT DOCUMENTS

DE    102007007918 A1    8/2008

OTHER PUBLICATIONS

International Search Report and Written Opinion for Application No. PCT/IB2015/056443 dated Nov. 13, 2015 (11 pages).

*Primary Examiner* — Lindsay Low
*Assistant Examiner* — George Jin
(74) *Attorney, Agent, or Firm* — Michael Best & Friedrich LLP

(57) ABSTRACT

A fuel supply system includes a fuel pump having an inlet configured to pick up fuel and an outlet configured to discharge fuel. A pressure vessel is in fluid communication with the outlet of the fuel pump such that fuel is directed from the fuel pump into the pressure vessel, the pressure vessel having an outlet port. A pressure regulation valve subassembly is detachably coupled with the outlet port via a male-female interface that positively locks against axial separation upon axial coupling in a first orientation and relative rotation of less than 360 degrees to a second orientation. A reservoir defines an internal space at least partially receiving the fuel pump, the pressure vessel, and the pressure regulation valve subassembly. The reservoir includes an interior wall that obstructs rotation of the (Continued)

pressure regulation valve subassembly from the second orientation to the first orientation.

20 Claims, 10 Drawing Sheets

(51) Int. Cl.
*F02M 37/00* (2006.01)
*F02M 37/22* (2006.01)
(58) Field of Classification Search
CPC .......... F02M 37/0094; F02M 2037/226; Y10T 137/794; Y10T 137/86196; B60K 15/077; B60K 15/073; B60K 15/01; F04D 29/60; F04D 29/605; F04D 29/606; F04D 29/406; F04D 13/08; F04D 13/086; F04D 13/16; F04B 39/12; F04B 39/127; F04B 39/14; F04B 53/16; F04B 53/22
See application file for complete search history.

(56) References Cited

U.S. PATENT DOCUMENTS

| | | | |
|---|---|---|---|
| 2005/0067023 A1 | 3/2005 | Palvolgyi | |
| 2006/0260696 A1* | 11/2006 | Leymarie | B60K 15/077 137/565.17 |
| 2008/0127944 A1* | 6/2008 | Ramamurthy | F02M 37/106 123/457 |
| 2010/0126473 A1* | 5/2010 | Froehlich | F02M 37/106 123/506 |
| 2013/0312711 A1* | 11/2013 | Mason | F02M 37/0023 123/509 |

* cited by examiner

FUEL PUMP MODULE WITH REPLACEABLE FILTER UNIT

CROSS-REFERENCE TO RELATED APPLICATIONS

The present application claims priority to U.S. Provisional Patent Application No. 62/042,628, filed Aug. 27, 2014, the entire contents of which are hereby incorporated by reference.

BACKGROUND

The present invention relates to fuel supply systems, such as those provided within a motor vehicle. Although a vehicular fuel supply system will include a variety of components for managing the supply of fuel from a fuel tank to an internal combustion engine, a portion of the fuel supply system commonly referred to as the fuel pump module resides within the fuel tank and typically includes a pump unit and a filter unit. The pump unit pumps fuel from the tank through the filter unit and out to the engine. The pressure at the outlet of the fuel pump module can be regulated by a valve. In a typical system, the filter unit includes at least one permanent hose connection to a mounting flange such that routine replacement of the filter unit is not feasible. The pressure regulating valve of the fuel pump module may also be permanently locked in place with respect to the filter unit upon original assembly of the filter unit, for example, as the pressure regulating valve is captured between upper and lower portions of a housing that are welded together at the time of manufacture.

SUMMARY

In one aspect, the invention provides a fuel supply system including a fuel pump having an inlet configured to pick up fuel and an outlet configured to discharge fuel. A pressure vessel is in fluid communication with the outlet of the fuel pump such that fuel is directed from the fuel pump into the pressure vessel, the pressure vessel having an outlet port. A pressure regulation valve subassembly is detachably coupled with the outlet port via a male-female interface that positively locks against axial separation upon axial coupling in a first orientation and relative rotation of less than 360 degrees to a second orientation. A reservoir defines an internal space at least partially receiving the fuel pump, the pressure vessel, and the pressure regulation valve subassembly. The reservoir includes an interior wall that obstructs rotation of the pressure regulation valve subassembly from the second orientation to the first orientation.

In another aspect, the invention provides a fuel pump module for a motor vehicle including an engine. The fuel pump module includes a fuel pump, a tank-mounting flange having a fitting for attachment with a fuel supply line to the engine, and a filter unit having no direct fluid connection to the tank-mounting flange. The filter unit includes a housing defining a pressure vessel coupled to an outlet of the fuel pump, a cover defining an upper portion of the pressure vessel and forming an outlet port of the pressure vessel, and a filter positioned within the pressure vessel. A pressure regulation valve subassembly is removably coupled to the outlet port via an interface that allows free axial coupling and decoupling in a first rotational orientation of the pressure regulation valve subassembly relative to the outlet port and provides positive axial locking in a second rotational orientation of the pressure regulation valve subassembly relative to the outlet port. The filter unit is non-destructively removable from the pressure regulation valve subassembly to facilitate exchange of the filter unit within the fuel pump module.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
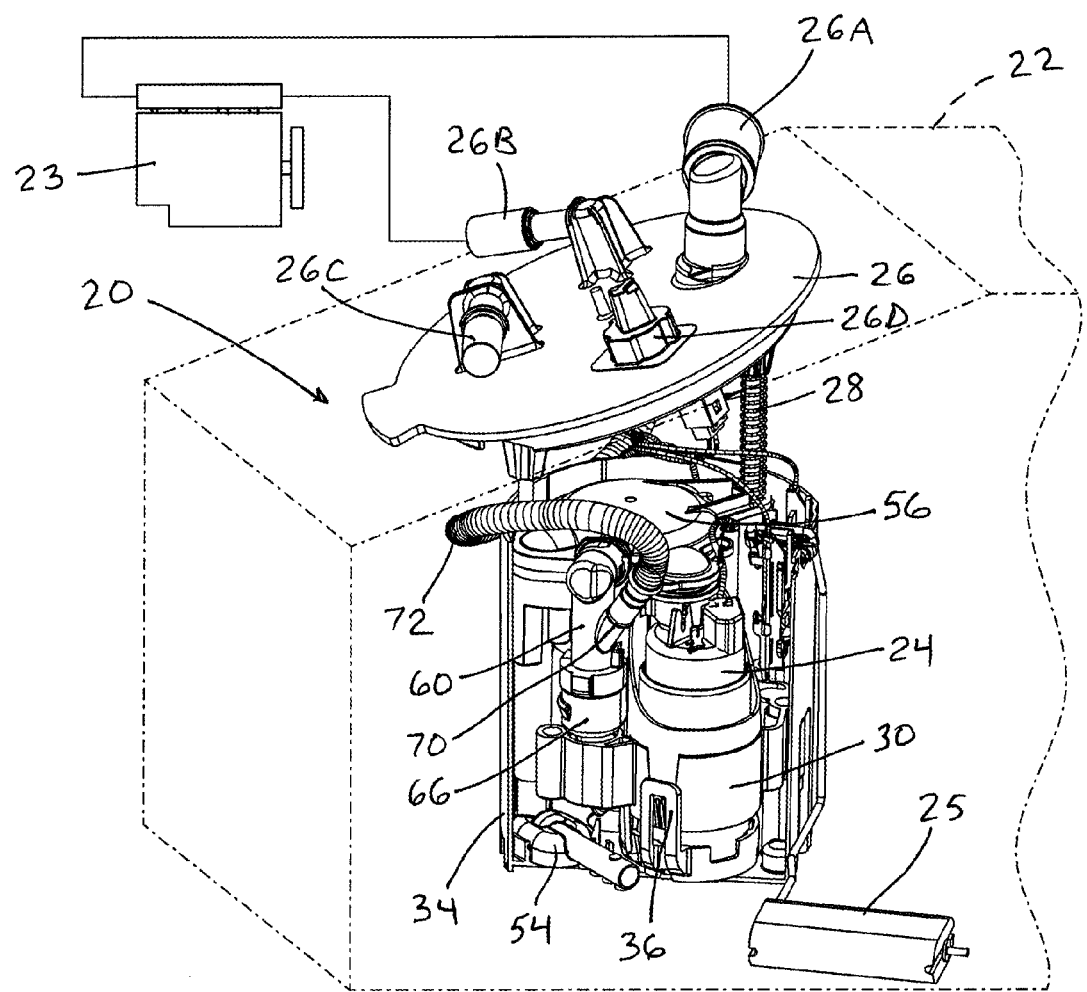
FIG. 1 is a schematic view of a fuel supply system for a motor vehicle including a fuel pump module according to one embodiment.
Figure 2:
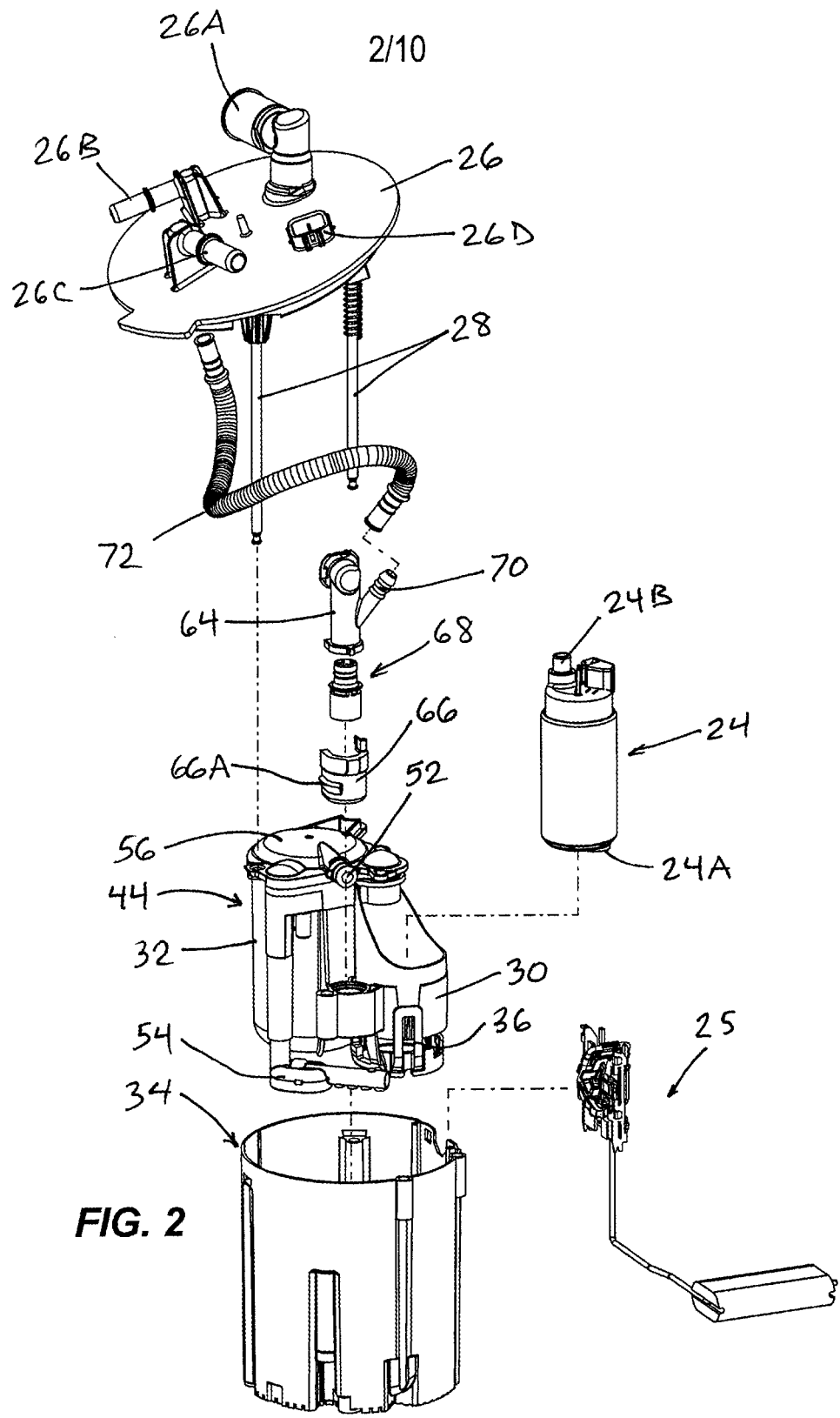
FIG. 2 is an exploded assembly view of the fuel pump module of FIG. 1.

As shown in FIG. 1, a fuel supply module or fuel pump module 20 is provided as part of a fuel supply system for a motor vehicle. The fuel pump module 20 is positioned within a fuel tank 22 of the motor vehicle for supplying fuel to a fuel burning device, such as an internal combustion engine 23. The pump module 20 includes a fuel pump, or pump unit 24 operable to pressurize liquid fuel when energized for movement though the system. The pump unit 24 is positioned in a receptacle 30 of a housing 32. The pump unit 24 can be insertable into the receptacle 30 in the axial or vertical direction and can be retained with a clip 36 or other device. In other constructions, the pump unit 24 may be positioned relative to the housing 32 in other ways. Although positionally retained in relation to the housing 32, the pump unit 24 also includes a case or housing of its own. The pump unit 24 defines an inlet 24A (e.g., at a bottom end) and an outlet 24B (e.g., at an upper end) between which the pump unit 24 includes a mechanism for pressurizing fuel. Although not shown, an inlet filter or strainer may be provided at the inlet 24A. A reservoir 34 defining a cup-like fuel chamber at least partially receives the pump unit 24 and the housing 32 such that the pump unit 24 is submerged in a relatively consistent level of fuel independent of the prevailing level or potential sloshing within the tank 22. A fuel level sensor 25 supported by the fuel pump module 20 is operable to sense a fuel level outside the reservoir 34 within the tank 22. The fuel level sensor 25 can be a float type as shown or another type of level sensor. FIG. 2 shows components of the fuel pump module 20 in an exploded assembly view.

A tank-mounting flange 26 is provided at a top end of the fuel pump module 20 such that the housing 32 and the pump module 20 are suspended below by a plurality of guide rods 28. The flange 26 resides in an opening of the fuel tank 22 and has an exterior surface provided with hydraulic and electrical connections for communication between the fuel pump module 20 and the engine 23, the environment, an electrical power source (e.g., battery), and an electronic controller. The flange 26 can include fuel send and return ports 26A, 26B, a vent port 26C, and an electronic plug connection 26D.

Figure 6:
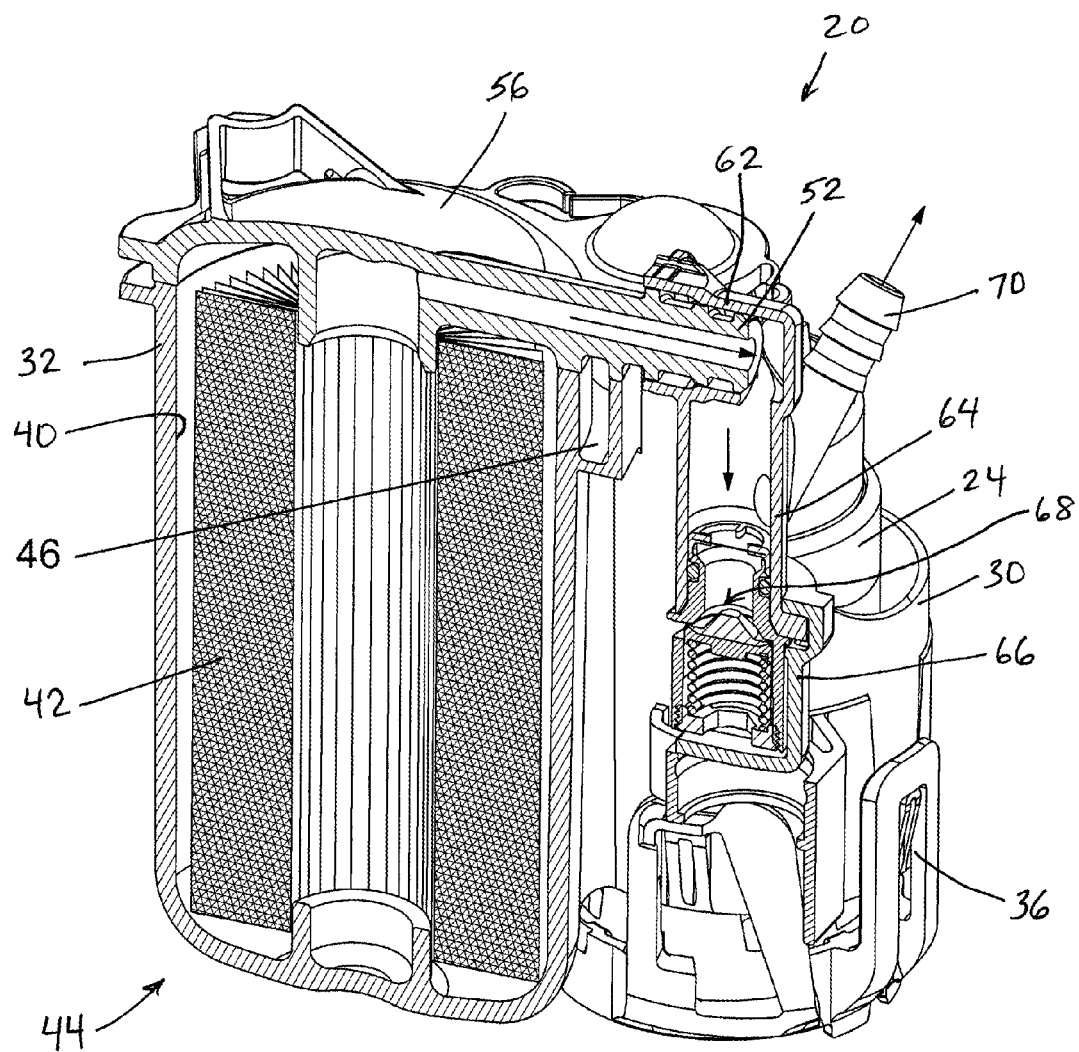
FIG. 6 is a cross-section view taken along line 6-6 of FIG. 3.

The housing 32 defines a pressure vessel 40 (FIG. 6) receiving the fuel pressurized by the pump unit 24. The pressure vessel 40 can constitute a majority portion of the housing 32. The pressure vessel 40 can be utilized for defining a volume directly surrounding a filter 42. Thus, the pressure vessel 40 can be part of a filter unit 44 positioned alongside and functionally downstream of the pump unit 24. Fuel is pumped via the pump unit 24 through a check valve (not shown) to the pressure vessel 40 and out an outlet port 52 toward the engine 23 via the flange 26. FIG. 6 illustrates a portion of an intermediate channel 46 in the housing 32 which directs fuel from the outlet 24B of the pump unit 24 into the pressure vessel 40. An auxiliary outlet from the housing 32 between the pump outlet 24B and the pressure vessel 40 drives a jet pump 54 which continually operates to pump fuel from the tank 22 into the reservoir 34. The illustrated outlet port 52 is formed integrally as a single piece with a cover 56 located at an upper end of the pressure vessel 40. The cover 56 may be permanently affixed to the housing 32 to define the pressure vessel 40 (e.g., by hot plate welding or other type of non-serviceable connection which is not removable without destructive means).

Figure 3:
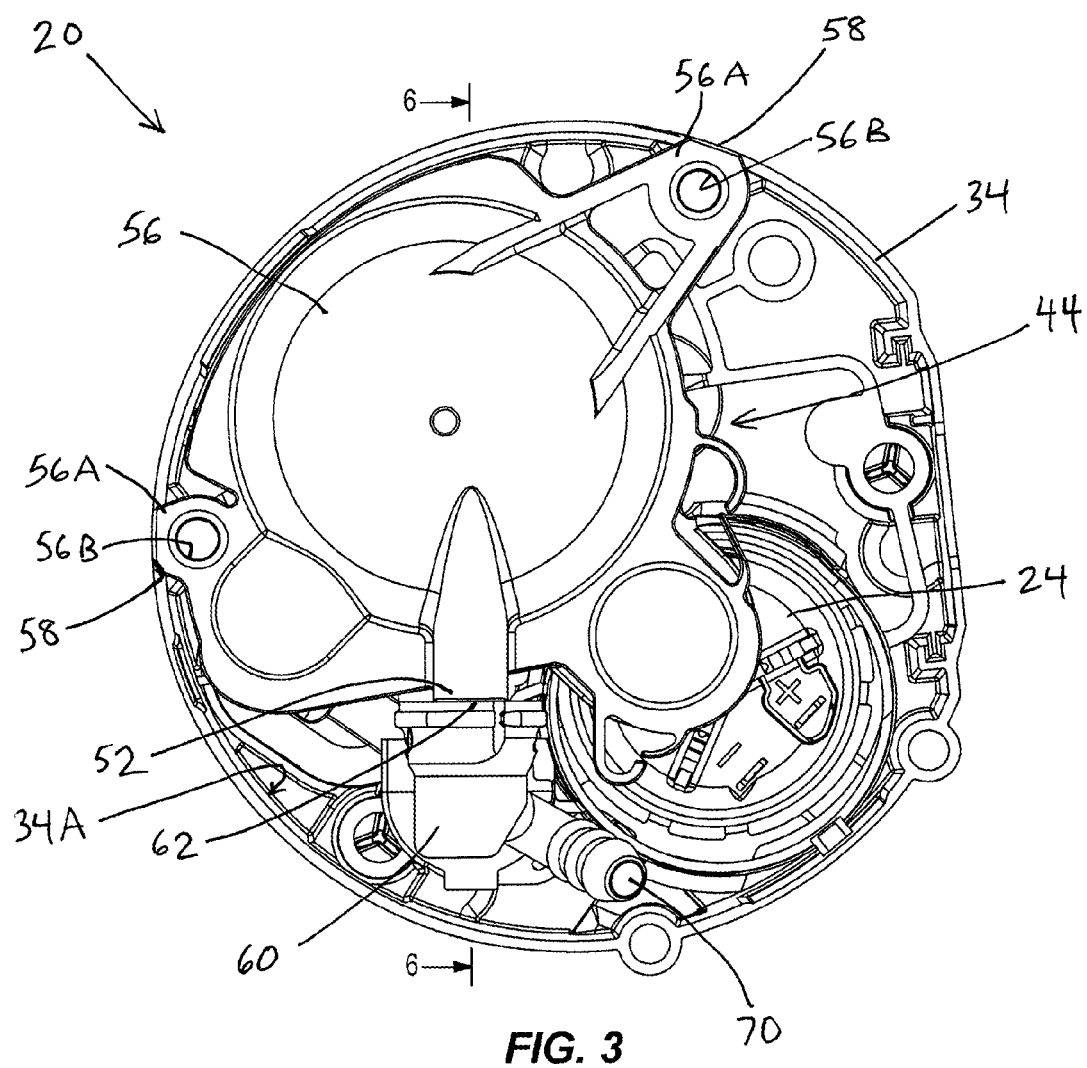
FIG. 3 is a top view of a portion of the fuel pump module of FIG. 1.
Figure 4:
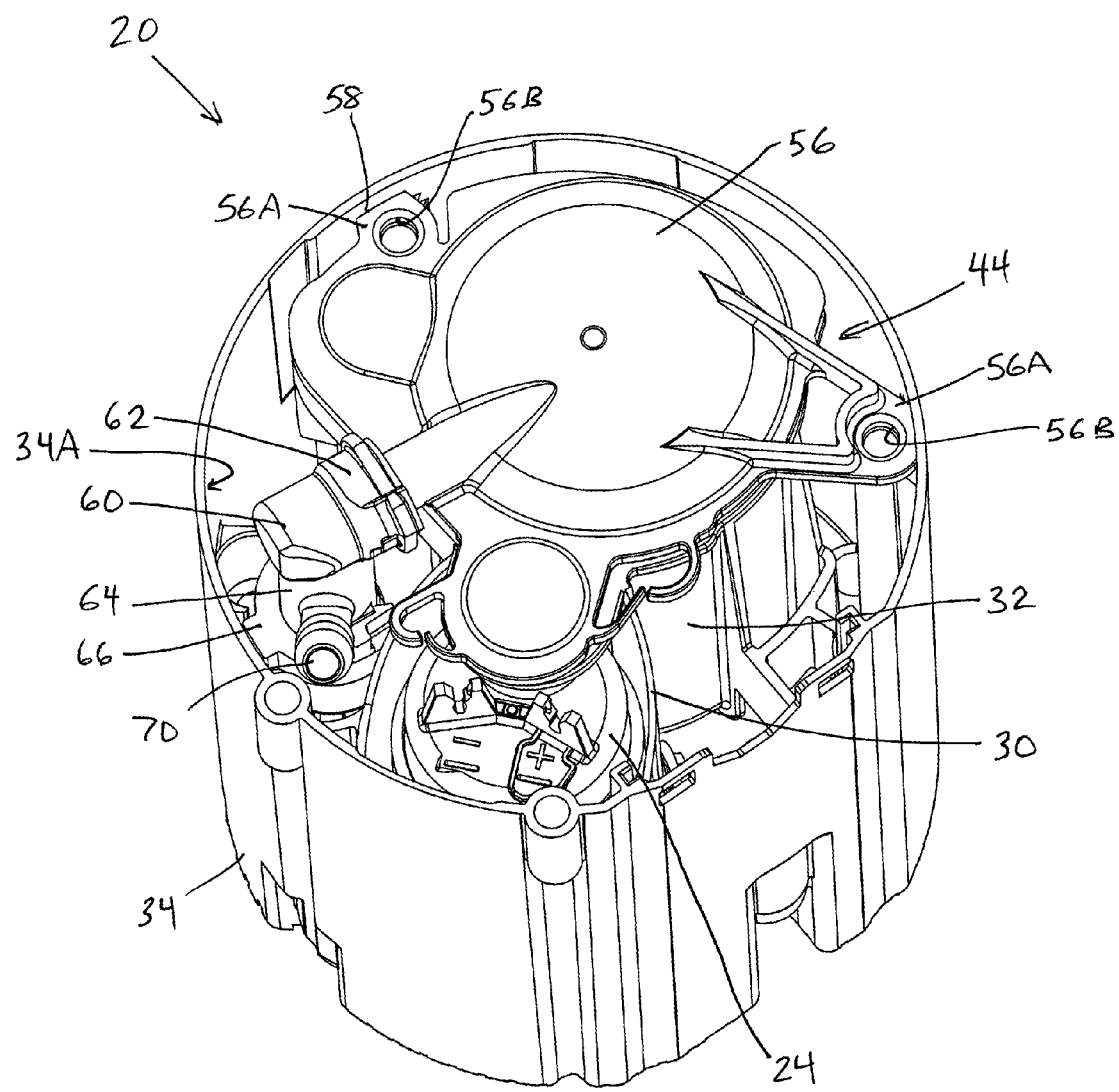
FIG. 4 is a perspective view of the portion of the fuel pump module shown in FIG. 3.
Figure 5:
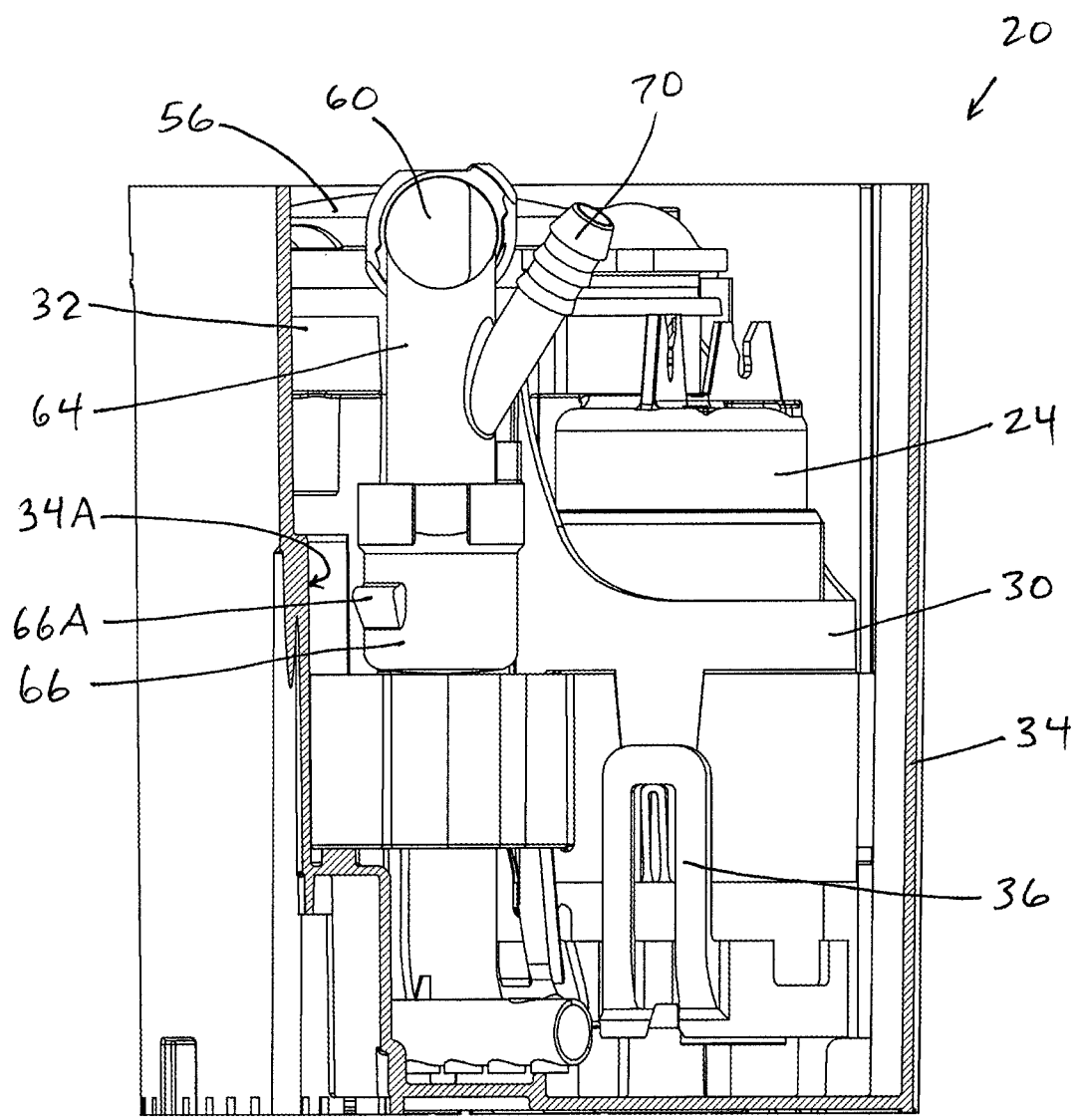
FIG. 5 is a side view of the fuel pump module with a portion of a reservoir wall removed to illustrate a pressure regulating valve subassembly in an assembled orientation.

The cover 56 includes a plurality of mounting tabs 56A at a periphery thereof. Each of the mounting tabs 56A extends outwardly away from the pressure vessel 40 and physically interferes with the reservoir 34 in top view (FIG. 3). An aperture 56B is provided through each of the mounting tabs 56A, the apertures 56B receiving corresponding ones of the guide rods 28. Just below its top edge, the reservoir 34 is provided with corresponding openings 58 for receiving the mounting tabs 56A. The reservoir 34 can be flexed and elastically deformed to allow the mounting tabs 56A to be positioned into the corresponding openings 58 at the time of assembly. Once assembled, the guide rods 28 prevent movement that may otherwise lead to disassembly of the housing 32, and thus the filter unit 44 and the pump unit 24, from the reservoir 34, and the position of the fuel pump module 20 within the tank 22 is maintained during normal operation.

A pressure regulation valve subassembly 60 includes an opening 62 coupled to the outlet port 52, which forms the outlet of the pressure vessel 40 and of the filter unit 44 as a whole. The opening 62 forms an inlet port of the pressure regulation valve subassembly 60 as shown. The connection between the pressure regulation valve subassembly 60 and the outlet port 52 is discussed in further detail below. The pressure regulation valve subassembly 60 has a tubular body 64 extended at a 90-degree angle from the opening 62, the body 64 extending generally downward away from the flange 26 toward a bottom wall of the reservoir 34 to terminate at an end cover 66 at its lower end. A pressure regulating valve 68 is positioned within a chamber of the pressure regulation valve subassembly 60, for example, at a bottom of the body 64, at least partially within the end cover 66. The pressure regulating valve 68 controls outlet pressure at an outlet 70 of the pressure regulation valve subassembly 60 by allowing excess flow to escape back into the reservoir 34 without being passed to the outlet 70. The pressure regulating valve 68 can include an elastomeric closing element and a biasing spring to bias the elastomeric closing element closed such that the biasing spring is at least partially compressed when exposed to fuel pressure above a set point. As shown in FIG. 1, the outlet 70 of the pressure regulation valve subassembly 60 can be coupled to the flange 26 via a permanent, one-time use hose connection (e.g., a hose 72 pressed onto a barbed exterior portion of the outlet 70 causing plastic deformation in the hose 72). The pressure regulation valve subassembly 60 may be solely supported at its upper end by engagement of the opening 62 with the outlet port 52 such that the bottom end of the pressure regulation valve subassembly 60 is free from connection to surrounding structure. As illustrated, the chamber in which the pressure regulating valve 68 is provided receives 100 percent of the flow from the outlet port 52.

Figure 7:
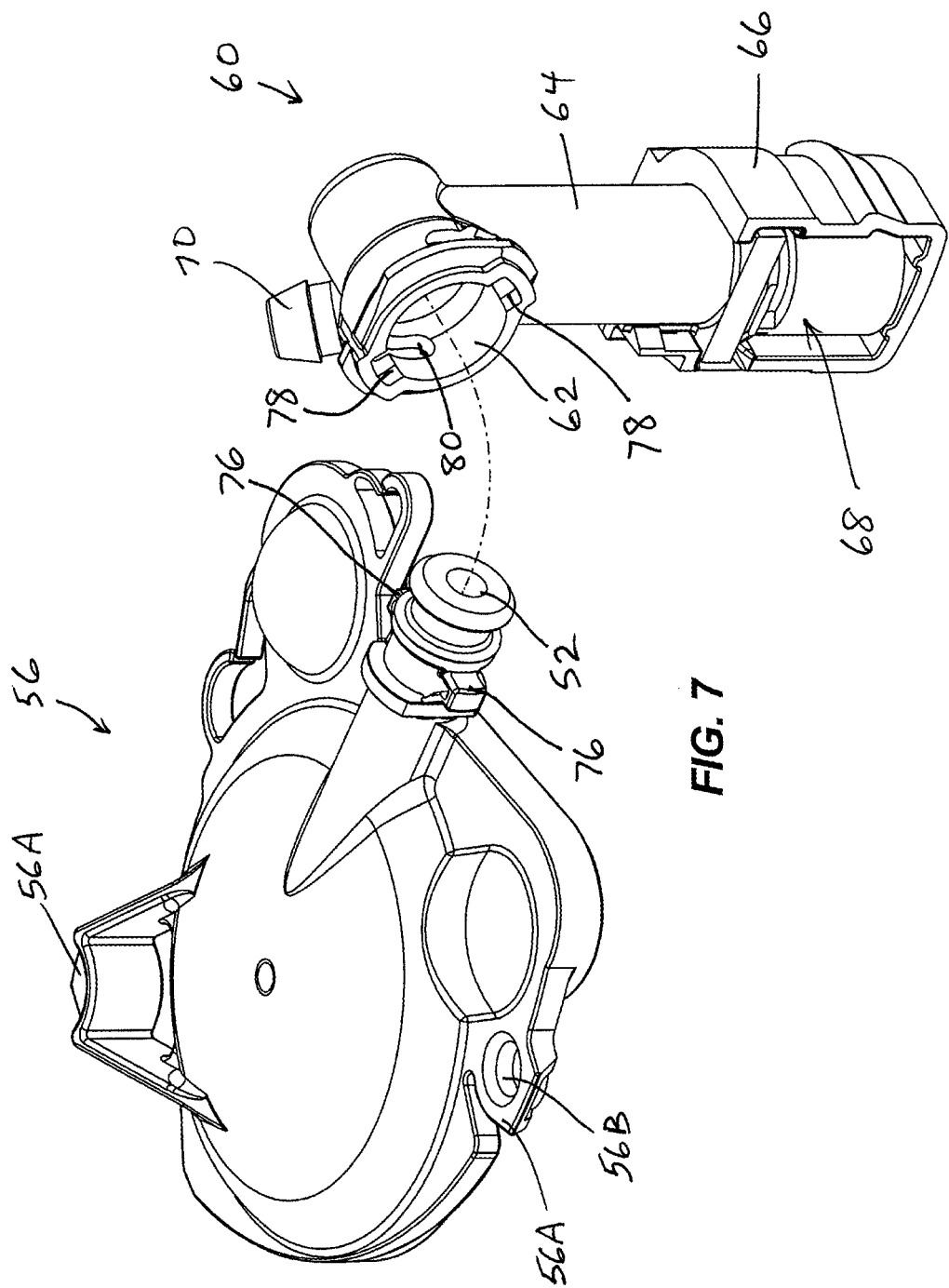
FIG. 7 is a perspective view of the interfacing ends of a filter unit outlet port and the pressure regulating valve subassembly.
Figure 8:
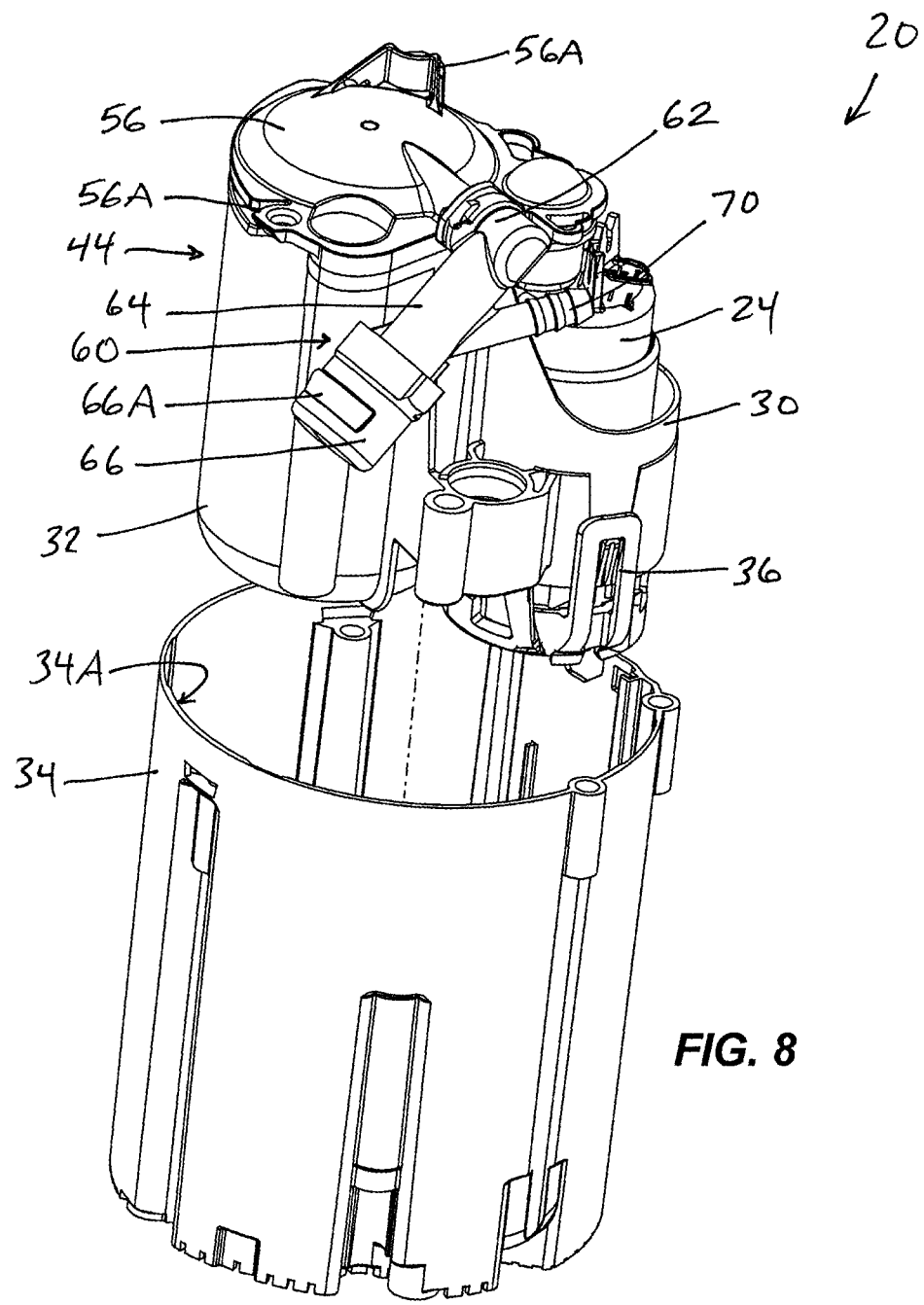
FIG. 8 is a perspective view showing a disassembly sequence for removing the filter unit from the fuel pump module.

As best shown in FIG. 7, a twist-to-lock male-female interface is provided between the outlet port 52 and the opening 62 of the pressure regulation valve subassembly 60 that prevents axial separation of the pressure regulation valve subassembly 60 from the filter unit 44 once the pressure regulation valve subassembly 60 is rotated relative to the outlet port 52 from a first orientation to a second orientation. As used herein, preventing axial separation refers to positive axial locking such that axial separation is not possible without resorting to plastic deformation or breakage. Although the connection between the outlet port 52 and the pressure regulation valve subassembly 60 may allow the pressure regulation valve subassembly 60 to be freely rotatable back-and-forth between the first orientation and the second orientation, abutment of the pressure regulation valve subassembly 60 with an inside wall 34A of the reservoir 34 in the assembled state of the fuel pump module 20 blocks the pressure regulation valve subassembly 60 from returning from the second orientation to the first orientation. Optionally, the pressure regulation valve subassembly 60 may include a projection 66A (e.g., formed on the end cover 66) facing the inside wall 34A to further limit the allowable movement of the pressure regulation valve subassembly 60 inside the reservoir 34. Once the filter unit 44 and the pressure regulation valve subassembly 60 are removed from the reservoir 34 as shown in FIG. 8, the pressure regulation valve subassembly 60 is easily detached from the outlet port 52 after rotating the pressure regulation valve subassembly 60 back to the first orientation. Despite the outlet port 52 being shown as a male fitting and the opening 62 shown as a female fitting, the male-female relationship may be reversed.

Returning to FIG. 7, it can be seen that at least one key 76 is provided on an exterior of the outlet port 52, and the opening 62 is provided with a corresponding at least one key slot 78 in which the key 76 is receivable when the pressure regulation valve subassembly 60 is in the first orientation, for assembly and disassembly. In some embodiments, the key 76 and the key slot 78 are reversed such that the key slot 78 is provided on the outlet port 52. Once the key 76 is sufficiently inserted axially into the key slot 78, the key 76 comes into alignment with a circumferential slot or groove 80 that extends partially or fully around the opening 62 of the pressure regulation valve subassembly 60 such that the pressure regulation valve subassembly 60 may be rotated relative to the outlet port 52 to a position (the second orientation mentioned above) in which the key 76 is no longer aligned with the key slot 78 and axial separation is prevented. Rotation between the first orientation and the second orientation is less than 360 degrees (e.g., 180 degrees or less, 90 degrees or less, 45 degrees or less, etc.).

The filter unit 44 can be disconnected from the remainder of the fuel pump module 20, removed and replaced while maintaining the fuel line connection (e.g., via hose 72) between the pressure regulation valve subassembly 60 and the tank-mounting flange 26. This is accomplished by removing the fuel pump module 20 from the fuel tank 22 by detaching the tank-mounting flange 26 and pulling the fuel pump module 20 out the tank opening. The fuel level sensor 25 may first be removed. Then, the guide rods 28 are detached and removed from the cover 56. The submodule consisting of the pump unit 24, the filter unit 44, and the pressure regulation valve subassembly 60 is then lifted from the reservoir 34. The mounting tabs 56A and/or the reservoir 34 may deflect elastically to enable the separation between the mounting tabs 56A and the openings 58. With the submodule out of the reservoir 34, the pressure regulation valve subassembly 60 is rotated relative to the outlet port 52 of the filter unit 44 from the second orientation to the first orientation as shown in FIG. 8. It will be understood that the relative rotation as referred to above may also be accomplished by holding the pressure regulation valve subassembly 60 stationary while rotating the remainder of the submodule. Once in the first orientation, the pressure regulation valve subassembly 60 is axially separated from the outlet port 52. A plug-in connection between the pump unit 24 and the filter unit 44 is also separated, leaving the filter unit 44 entirely free from the remaining components. A new filter unit 44 identical to the illustrated and described filter unit 44 may be installed by reversing the above described procedure to extend the useful life of the fuel pump module 20 with minimal waste by not replacing components that are reusable, such as the tank-mounting flange 26, the pressure regulation valve subassembly 60, and the jet pump 54. In some instances, the procedure may additionally or alternately allow for servicing or replacing the pressure regulating valve 68 when the submodule is removed from the reservoir 34. The pressure regulating valve 68 is accessed for service or replacement by temporary removal of the end cover 66 from the body 64, which is then subsequently replaced or reinstalled. The end cover 66 may be provided with a slide-on interface, a twist-to-lock interface, or a threaded interface with the body 64.

Although the pressure vessel 40 is described and illustrated as forming a filter unit 44 and enclosing a filter 42 such as a fabric filter element, the filter 42 may take any variety of other forms and may be omitted entirely, relying instead on filtering further upstream and/or downstream.

Figure 9:
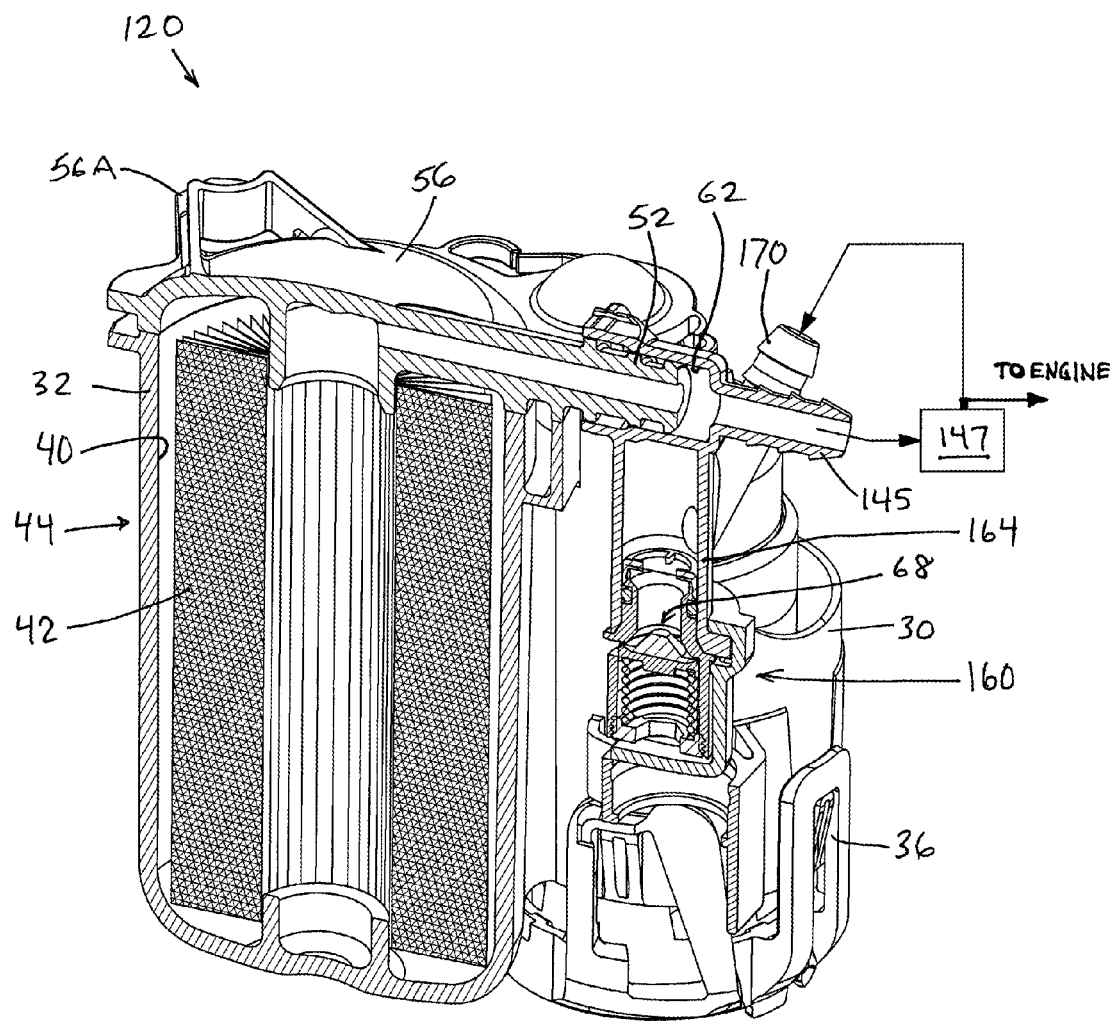
FIG. 9 is a cross-section view of a fuel pump module according to another embodiment
Figure 10:
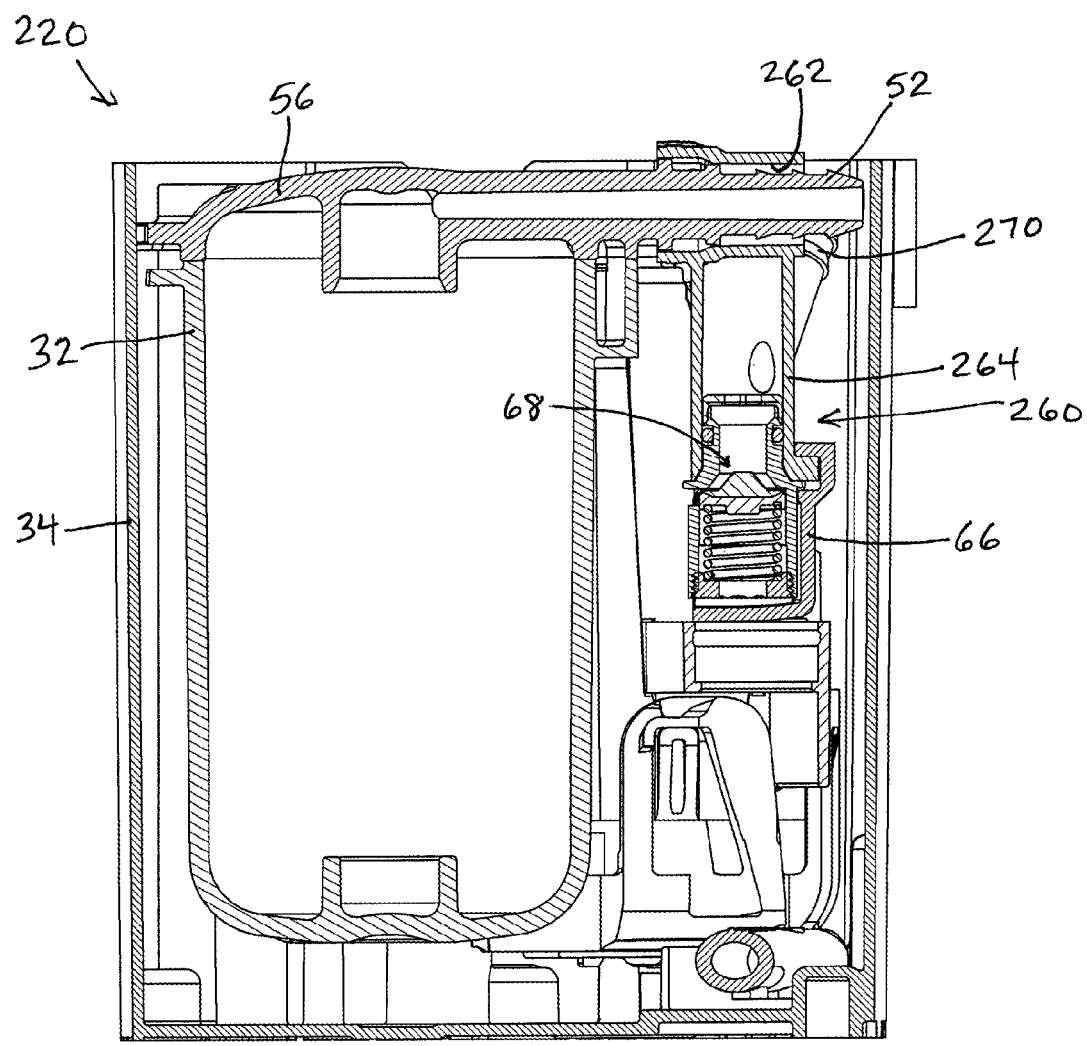
FIG. 10 is a cross-section view of a fuel pump module according to yet another embodiment.

FIG. 9 illustrates a portion of a fuel pump module 120 that may be identical in all respects to FIGS. 1-8 and the above description, except where noted. Thus, the preceding disclosure is relied upon for features not specifically reiterated below. Although the pressure regulation valve subassembly 160 has an opening 62 engaged with the outlet port 52 as described above, the opening 62 does not form an inlet port directly providing fluid communication to the chamber in which the pressure regulating valve 68 is provided. Rather, the opening 62 at the upper end of the pressure regulation valve subassembly 160 extends directly and only to an outlet port 145 at the upper end such than none of the fuel from the outlet port 52 is conveyed directly to the chamber in which the pressure regulating valve 68 is provided. Although shown as a coaxial male fitting, the outlet port 145 may take any number of alternate forms. The outlet port 145 may be connected to the inlet of an external filter 147 (e.g., "fine filter"). From the filter 147, filtered fuel is routed via parallel lines to the engine 23 and to the pressure regulation valve subassembly 160 via an inlet port 170, which leads directly into the chamber in which the pressure regulating valve 68 is provided. Although the filter 42 is shown inside the pressure vessel 40, the external filter 147 may be used in lieu of the internal filter 42 and the pressure vessel 40 may be empty as shown in FIG. 10. It is noted that the inlet port 170 of FIG. 9 is formed by a side port in the body 164 of the pressure regulation valve subassembly 160 that is identical in form to the side port forming the outlet 70 in the pressure regulation valve subassembly 60 of FIGS. 1-8. Thus, the two variations may be produced via common mold tooling, or at least portions thereof, with minimal modification.

FIG. 10 illustrates a portion of a fuel pump module 220 that may be identical in all respects to FIGS. 1-8 and the above description, except where noted. Thus, the preceding disclosure is relied upon for features not specifically reiterated below. Although the pressure regulation valve subassembly 260 has an opening 262 engaged with the outlet port 52 as described above, the opening 262 does not form an inlet port directly providing fluid communication to the chamber in which the pressure regulating valve 68 is provided. Rather, the opening 262 at the upper end of the pressure regulation valve subassembly 260 extends as a through hole entirely through the body 264 to provide access to the outlet port 52 on an opposite side of the body 264. As such, none of the fuel from the outlet port 52 is passed directly to the chamber in which the pressure regulating valve 68 is provided. Although not shown, the outlet port 52 may be connected to the inlet of an external filter (e.g., "fine filter"). From the filter, filtered fuel is routed via parallel lines to the engine 23 and back into the pressure regulation valve subassembly 260 via an inlet port 270, which leads directly into the chamber in which the pressure regulating valve 68 is provided. It is noted that the inlet port 270 of FIG. 10 is formed by a side port in the body 264 of the pressure regulation valve subassembly 260 that is identical in form to the side port forming the outlet 70 in the pressure regulation valve subassembly 60 of FIGS. 1-8. Thus, the two variations may be produced via common mold tooling, or at least portions thereof, with minimal modification.

What is claimed is:

1. A fuel supply system comprising:
    a fuel pump having an inlet configured to pick up fuel and an outlet configured to discharge fuel;
    a pressure vessel in fluid communication with the outlet of the fuel pump such that fuel is directed from the fuel pump into the pressure vessel, the pressure vessel having an outlet port;
    a pressure regulation valve subassembly detachably coupled with the outlet port via a male-female interface that positively locks against axial separation upon axial coupling in a first orientation and relative rotation of less than 360 degrees to a second orientation; and
    a reservoir defining an internal space at least partially receiving the fuel pump, the pressure vessel, and the pressure regulation valve subassembly, the reservoir including an interior wall that obstructs rotation of the pressure regulation valve subassembly from the second orientation to the first orientation.

2. The fuel supply system of claim 1, wherein the pressure regulation valve subassembly is freely rotatable from the second orientation to the first orientation when the pressure vessel and the pressure regulation valve subassembly are removed from the reservoir.

3. The fuel supply system of claim 1, wherein the pressure vessel is defined by a housing and a cover joined therewith.

4. The fuel supply system of claim 3, wherein the housing includes a recess at least partially receiving the fuel pump to position the fuel pump alongside the pressure vessel.

5. The fuel supply system of claim 3, wherein the outlet port is provided in the cover.

6. The fuel supply system of claim 1, further comprising a fuel filter positioned within the pressure vessel.

7. The fuel supply system of claim 1, wherein the pressure vessel has a periphery defining two tabs engageable with corresponding openings formed in the reservoir for securing the pressure vessel within the reservoir, the fuel supply system further comprising two guide rods extending from a tank-mounting flange through apertures in the corresponding tabs.

8. The fuel supply system of claim 1, wherein the male-female interface positively locks against axial separation upon relative rotation of 180 degrees or less from the first orientation to the second orientation.

9. The fuel supply system of claim 1, wherein the pressure regulation valve subassembly defines a chamber in which a pressure regulating valve is provided, and wherein 100 percent of the flow from the outlet port of the pressure vessel is directly received by the chamber.

10. The fuel supply system of claim 1, wherein the pressure regulation valve subassembly defines a chamber in which a pressure regulating valve is provided, and wherein none of the flow from the outlet port of the pressure vessel is directly received by the chamber, the fuel supply system further comprising a filter external to the pressure vessel connected to receive the flow from the outlet port of the pressure vessel, wherein the chamber of the pressure regulation valve subassembly is connected to receive the flow from the filter.

11. A fuel pump module for a motor vehicle including an engine, the fuel pump module comprising:
a tank-mounting flange having a fitting for attachment with a fuel supply line to the engine;
a fuel pump;
a filter unit having no direct fluid connection to the tank-mounting flange, the filter unit including
housing defining a pressure vessel coupled to an outlet of the fuel pump,
a cover defining an upper portion of the pressure vessel and forming an outlet port of the pressure vessel, and
a filter positioned within the pressure vessel; and
a pressure regulation valve subassembly removably coupled to the outlet port via an interface that allows free axial coupling and decoupling in a first rotational orientation of the pressure regulation valve subassembly relative to the outlet port and provides positive axial locking in a second rotational orientation of the pressure regulation valve subassembly relative to the outlet port,
wherein the filter unit is non-destructively removable from the pressure regulation valve subassembly to facilitate exchange of the filter unit within the fuel pump module.

12. The fuel pump module of claim 11, further comprising a reservoir at least partially receiving the fuel pump, the pressure regulation valve subassembly, and the filter unit, wherein the reservoir prevents rotation of the pressure regulation valve subassembly from the second rotational orientation to the first rotational orientation when the filter unit is secured in a seated position within the reservoir.

13. The fuel pump module of claim 12, wherein the pressure regulation valve subassembly includes an end cover formed with a protrusion configured to abut an inside wall of the reservoir upon rotation of the pressure regulation valve subassembly from the second rotational orientation toward the first rotational orientation.

14. The fuel pump module of claim 12, wherein the cover includes two mounting tabs at a periphery thereof, and the reservoir includes corresponding openings receiving the mounting tabs to secure the filter unit in the seated position within the reservoir.

15. The fuel pump module of claim 14, further comprising two guide rods extending from the tank-mounting flange through apertures in the corresponding tabs.

16. The fuel pump module of claim 12, wherein the pressure regulation valve subassembly is freely rotatable from the second rotational orientation to the first rotational orientation when the pressure vessel and the pressure regulation valve subassembly are removed from the reservoir.

17. The fuel pump module of claim 11, wherein the interface is a male-female interface that positively locks against axial separation upon a relative rotation of less than 360 degrees from the first rotational orientation to the second rotational orientation.

18. The fuel pump module of claim 17, wherein the male-female interface positively locks against axial separation upon a relative rotation of 180 degrees or less from the first rotational orientation to the second rotational orientation.

19. The fuel pump module of claim 11, wherein the pressure regulation valve subassembly defines a chamber in which a pressure regulating valve is provided, and wherein 100 percent of the flow from the outlet port of the pressure vessel is directly received by the chamber.

20. The fuel pump module of claim 11, wherein the housing of the filter unit includes a recess at least partially receiving the fuel pump to position the fuel pump alongside the filter unit.

* * * * *